Patented Feb. 29, 1944

2,342,643

UNITED STATES PATENT OFFICE 2,342,643

METHOD OF IMPREGNATING FABRIC SHEET MATERIAL

Oren C. Cessna, Ann Arbor, Mich., assignor to The Guardite Corporation, a corporation of Illinois No Drawing. Application May 10, 1941, Serial No. 392,986

5 Claims. (Cl. 117—61)

The invention relates to a method of impregnating fabric sheet material with plastic, particularly thermoplastic material, so that the plastic is uniformly distributed through the sheet material.

At the present time, fabric materials which have been impregnated with plastics of various types are well known, but in all cases in which an attempt is made to produce a non-foraminous sheet, plastic has been applied in such manner as to be largely concentrated on one or both surfaces of the fabric so that a cross section thereof shows a much greater concentration of fabric at the center than at the surface edges.

By means of the present method, this difficulty is overcome and at the same time a method is provided by which fabric sheet material may be impregnated and liquid-proofed without the necessity of immersion in the plastic.

In accordance with the invention, a fabric sheet material such as paper, cloth or the like, is introduced to a vacuum chamber and non-condensible gas removed therefrom and replaced by an atmosphere of condensible gas at relatively low pressure. This operation is preferably carried out in accordance with the method described in the Merriam and Wiles Patent 2,080,179, issued May 11, 1937. It may be accelerated if desired by wetting or moistening the fabric material with any volatile solvent and particularly with a solvent for the plastic to be used, prior to or after the time of its introduction to the chamber.

Once the chamber is free from non-condensible gas, a solution of plastic material in a volatile solvent is introduced to the chamber in spray form, the spray being directed with substantial uniformity over the surface of the fabric material.

In carrying on the spraying operation, the vacuum and temperature should be correlated so that the plastic solution introduced has a temperature substantially above its boiling point and will consequently explode into very finely divided droplets. The explosion assists in distribution of the plastic and at the same time of course assists in drying of the solvent.

The plastic employed may be any soluble material such as paraffin, ethyl cellulose, styrene, formaldehyde resins, glyptal resins, or like materials. The solvent may be any inert volatile material.

As an example of the process, thin copy paper was subjected to a vacuum sufficient to remove non-condensibles, the pressure at the end of the evacuating cycles being 1 mm. of mercury, and then a solution of 10% paraffin and 90% perchlorethylene was introduced at a temperature of 196° F. The injection continued for a period of 5 seconds, the pressure in the meantime rising to 2.25 mm. The product became completely translucent, was impervious to water, and had a vapor phase permeability to water of only 0.05% of the permeability of the original material.

An uncalendered paper, medium heavy, subjected to the same conditions except that the temperature of the paraffin solution was 201°, likewise produced a completely impregnated, waterproof, translucent sheet having a vapor permeability of only 0.3% of the original material.

Under substantially similar conditions, using a heavy calendered paper, and a paraffin solution of 208°, the pressure rose from 1 mm. to 2 mm. after 5 seconds of injection, and the resulting product was partially translucent, waterproof, and had a vapor permeability of only 0.2% of the original material. The use of very short periods of injection prevents the accumulation of any substantial quantity of liquid on the surface of the fabric.

In some instances these impregnation runs were repeated two or three times, but the results were substantially the same.

When the same fabric was immersed for 15 minutes and the paraffin heated to substantially 200° F., the paraffin carried by the paper was substantially 25% greater than in the case of the vacuum impregnation and was substantially all on the surface of the material, whereas, with the vacuum process, the impregnation was substantially uniform throughout the body of the fabric.

In some cases the spray was introduced on both sides of the fabric, and below it, pointing upwardly, whereas, in other cases, the spray was introduced from the sides perpendicularly to the paper, but little if any difference was found in the results. The amount of paraffin produced by the vacuum process was generally between 0.10 and 0.15 gram per square inch of fabric.

Substantially similar results were obtained with other concentrations of paraffin as, for example, with a 20% solution in perchlorethylene. A 10% solution of paraffin in carbon tetrachloride also gave good results. It was found that best results were obtained with a heated solution, the solution preferably being above 150° F., and for perchlorethylene being preferably between 175 and 225° F.

It was also found desirable to maintain the temperature of the vacuum chamber at a fairly high point, optimum results being obtained between 170 and 210° F.

During the injection of the solution it is sometimes found desirable to continue a slight evacuation of the chamber, but in most cases this is found unnecessary, and in some cases it produces slightly poorer results.

The impregnated sheet material is superior in many ways to the ordinary impregnated product. For example, an ordinary paraffin-coated paper has most of its paraffin on the outside and, therefore, the paraffin tends to crack away from the paper when the latter is bent. In the present product the fabric gives support to all of the plastic and the same breaking tendency does not exist.

What I claim as new and desire to secure by Letters Patent is:

1. The method of impregnating fabric sheet material which comprises removing non-condensible gas from the fabric sheet material under high vacuum and replacing it with an atmosphere of condensible gas under high vacuum, spraying directly upon the fabric a finely divided stream of plastic material in a volatile solvent while maintaining a high vacuum and a temperature in the plastic solution above the boiling point of the solvent under the vacuum, whereby the solution explodes into finely divided droplets, and discontinuing the spray after a few seconds, whereby the presence of any substantial quantity of unevaporated solvent upon the fabric is avoided.

2. The method as set forth in claim 1, in which the amount of dry plastic material supplied to the fabric is approximately 0.1 to 0.15 gram per square inch.

3. The method as set forth in claim 1, in which the temperature of the plastic solution is between approximately 160° and 220° F., and in which the plastic is paraffin and the solvent is perchlorethylene.

4. The method as set forth in claim 1, in which the plastic is paraffin.

5. The method as set forth in claim 1, in which the plastic is ethyl cellulose.

OREN C. CESSNA.